US 6,746,131 B1

(12) United States Patent
Goldstein et al.

(10) Patent No.: US 6,746,131 B1
(45) Date of Patent: Jun. 8, 2004

(54) SOUND ACTIVATED LIQUID DISPLAY DEVICE

(75) Inventors: Steven G. Goldstein, 13482 Maxella Ave. #254, Marina Del Ray, CA (US) 90292; Mark R. Barton, Los Angeles, CA (US)

(73) Assignee: Steven G. Goldstein, Marina Del Ray, CA (US)

( * ) Notice: Subject to any disclaimer, the term of this patent is extended or adjusted under 35 U.S.C. 154(b) by 0 days.

(21) Appl. No.: 10/073,736

(22) Filed: Feb. 11, 2002

Related U.S. Application Data
(60) Provisional application No. 60/217,910, filed on Feb. 9, 2001.

(51) Int. Cl.[7] .............................................. F21V 33/00
(52) U.S. Cl. ...................................... 362/96; 362/86
(58) Field of Search ............................ 362/86, 87, 88, 362/96, 101, 318, 562, 806, 811; 84/464 R; 239/17, 18, 19, 20

(56) References Cited

U.S. PATENT DOCUMENTS

| 3,387,396 A | * | 6/1968 | Smith .......................... 40/406 |
| 4,376,404 A | | 3/1983 | Haddad ..................... 84/464 R |
| 5,272,604 A | * | 12/1993 | Lin ............................... 362/96 |
| 5,778,576 A | * | 7/1998 | Kaviani ....................... 40/409 |
| 5,913,595 A | * | 6/1999 | Lin ............................. 362/101 |
| 6,241,359 B1 | * | 6/2001 | Lin ............................... 362/96 |
| 6,276,612 B1 | | 8/2001 | Hall ............................ 239/17 |
| 6,447,138 B1 | * | 9/2002 | Yang ........................... 362/96 |

* cited by examiner

Primary Examiner—Sandra O'Shea
Assistant Examiner—Bao Q. Troung
(74) Attorney, Agent, or Firm—Robert W. J. Usher

(57) ABSTRACT

A transparent container has two immiscible liquids of different densities, colors and viscosities. A pump with a magnetic coupling injects the denser liquid upwardly into the less dense liquid in response to changes in sound volume or frequency of the vicinity of the device providing a geyser display reactive to music or voice. Pump control circuitry includes a microphone, an amplifier; a filter for extracting a beat from dance music or syllabic content of speech; an amplitude detector for detecting a short-time amplitude envelope; a long time averager providing a reference signal proportional to the average sound level and an attenuator; a comparator connected to both the averager and the attenuator to change state when the attenuated version of the short time amplitude envelope momentarily rises above reference signal to provide an activating signal to a pump power controller causing electric power to be delivered to the pump.

20 Claims, 5 Drawing Sheets

SOUND ACTIVATED LIQUID DISPLAY DEVICE

RELATED APPLICATION

Provisional application No. 60/267,910 filed Feb. 9, 2001, from which priority is claimed.

FIELD OF THE INVENTION

The invention relates to sound activated liquid display devices, such as lamps.

BACKGROUND OF THE INVENTION

Liquid display lamps of the general type which comprise a liquid container with a transparent wall portion in which two immiscible liquids having different visual characteristics and specific gravities or densities are mingled or merged for viewing through the wall portion to provide an interesting visual effect are well known and have been sold worldwide in large numbers for very many years.

U.S. Pat. No. 3,387,396, issued 1968 to Smith, the disclosure of which is incorporated herein by reference, describes one version in which the first, denser liquid can be a wax or jelling agent having a melting point above ambient/room temperature and normally resting as a mass at the bottom so that a portion thereof melts when heated from below by the lamp bulb, forming one or more globules of reduced density which separate, floating up into circulation and temporary suspension in the first liquid before cooling and falling back to the bottom of the container to coalesce with the remainder of the second liquid mass.

The rate of separation and mingling of the denser liquid with the less dense liquid is substantially constant as a constant heat source is taught, but could not change/react quickly even if a variable heat source were utilized as heat transfer rates are inherently relatively slow.

SUMMARY OF THE INVENTION

It is an object of the invention to provide a sound activated liquid display device in which the rate of mingling of two or more immiscible liquids of different densities and visual characteristics changes quickly in response to sounds, for example, music and voices.

According to one aspect, the invention provides a display device comprising a liquid container with a transparent wall portion containing two immiscible liquids having different visual characteristics and different specific gravities or densities and/or different viscosities and means responsive to changes in one or more sound parameters in the vicinity of the device, such as changes in volume or frequency, for injecting/circulating/mingling one liquid into another at rates related to the sound changes, for viewing through the wall portion to provide an interesting visual effect that reacts to music or voices.

One liquid can be injected into the other for dispersion and suspension therein as one or more distinct globules at rates and sizes determined by deviations from ambient sound levels.

The introduction of one or more liquids into another may be accomplished by one or more respective pumps, valves, injectors, or gravity-fed devices. Thus, a less dense liquid may be injected downwards into a denser liquid from the top, subsequently floating to the top, and a denser liquid may be injected upwards from the bottom, subsequently sinking. The immiscible liquids may, for example, be oil and water and, usually, more colored liquids are injected into less colored or clear liquids. By using multiple liquids and injecting means, a display with great, even rhythmic, movement can be produced with each liquid of a different specific gravity or viscosity reacting to a different sound frequency and or sound level.

The display device may include a lamp and means may also be provided to change the level of illumination provided by the lamp in response to changes in one or more sound parameters in the vicinity of the device.

Thus, the display device may include one or more pumps and/or valves that are controlled by an electronic circuit which includes: a microphone, pre-amp, AGC, selective frequency filters and motor and illumination control circuit.

According to another aspect, the invention provides a method of providing a liquid display by co-mingling immiscible liquids of different appearances at rates determined by changes in sound parameters particularly in the audio range.

BRIEF DESCRIPTION OF THE DRAWINGS

Specific embodiments of a sound activated liquid display lamp according to the invention will now be described by way of example only with reference to the accompanying drawings in which.

DESCRIPTION OF PARTICULAR EMBODIMENTS

Figure 1:
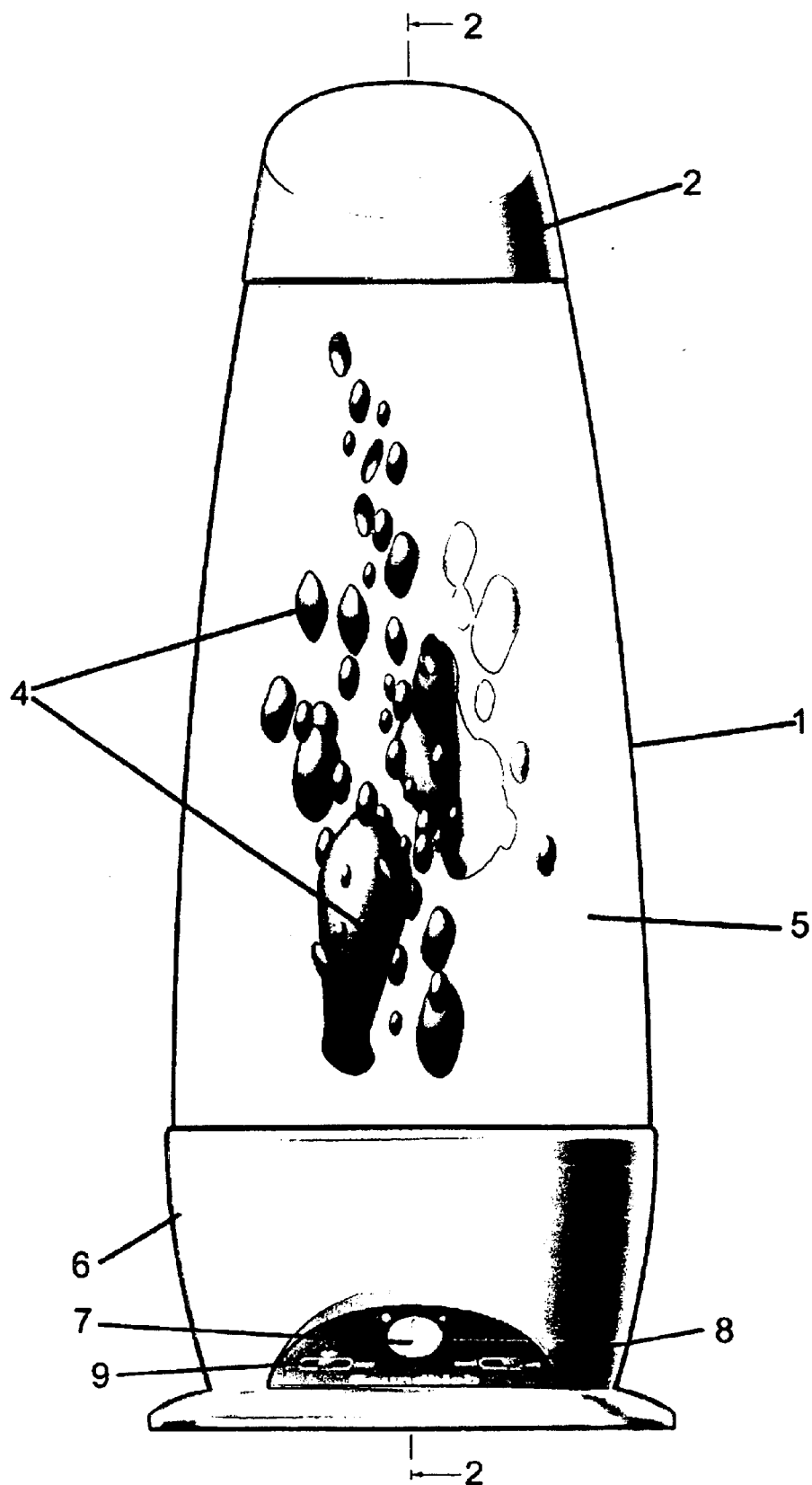
FIG. 1 is a perspective view of a front of an operating liquid display lamp, which view which is common to all embodiments.

As shown in FIG. 1, the display device comprises a generally bottle-shaped, container 1 made of clear plastic (or glass) with an opaque, plastic decorative cap 2 with globules 4 of an injected, first, denser liquid sinking through a second immiscible liquid 5 filling the container 1, and an opaque, plastic, receptacle-form base 6 which masks from view a reservoir/accumulation 4' of the denser liquid resting adjacent the bottom of the container. Mounted on the front of the base are a knob 7 for controlling the frequency response, switch 8 for switching the pump between sound activated and randomly activated states and switch 9, a three way switch for switching the lamp between off/on steady and sound responsive states.

Figure 2C:
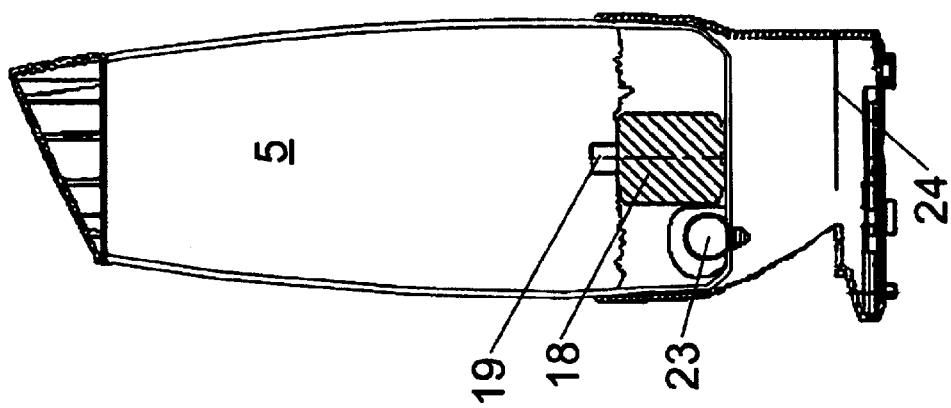
FIGS. 2(a)–(c) are schematic transverse cross-sectional views of first, second and third embodiments taken along a central vertical axis of the display device corresponding to line 2—2 of FIG. 1.
Figure 2B:
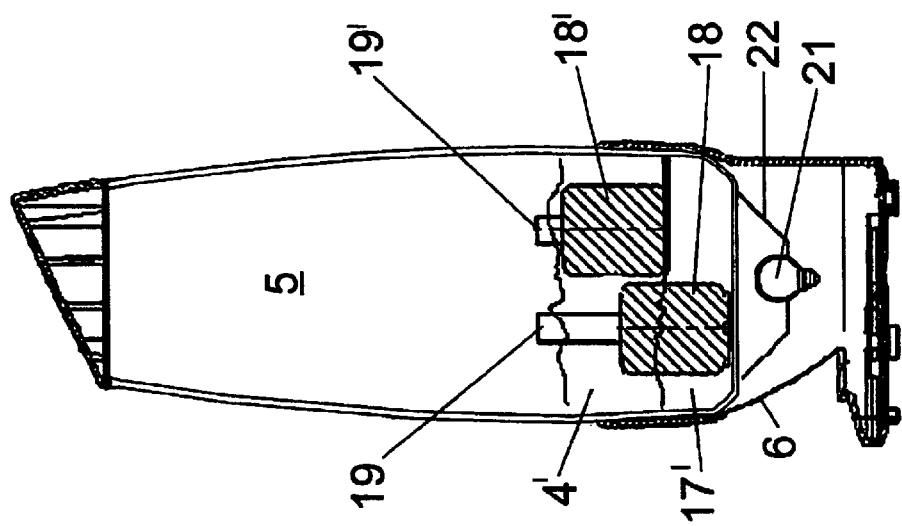
Figure 2A:
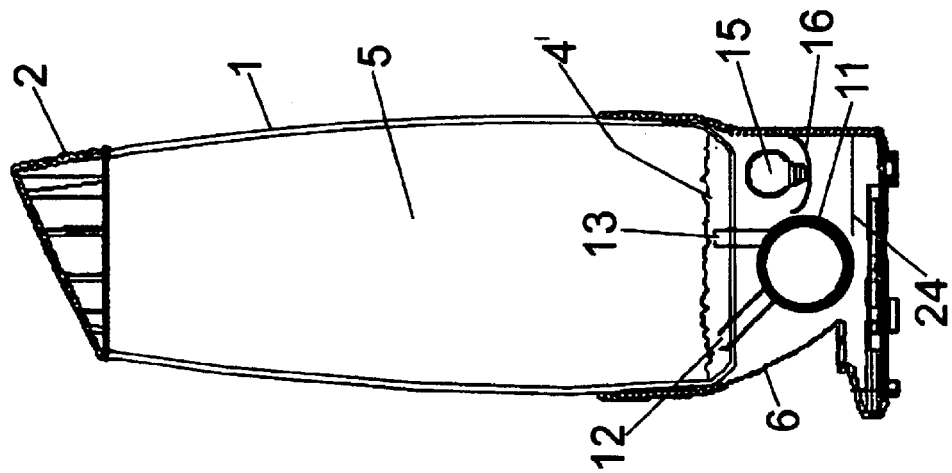

In the first embodiment shown in FIG. 2A, an electric in-line fluid pump 11 is mounted within the base and has inlets and outlets 12, 13, respectively communicating with the reservoir 4'. An electric bulb and reflector assembly 15, 16 is also mounted within the base adjacent the rear with the reflector 16 arranged to direct the bulb light upwards through the bottom of the container. Operation of the pump in response to changing sounds causes denser liquid of the reservoir 4' to be sucked into the inlet 12 and to spout intermittently from the outlet 13 with a geyser-like effect.

In the second embodiment shown in FIG. 2B, the container 1 also holds a third liquid, immiscible with, of greater density than, and having a different appearance than the other liquids, accumulated on the bottom of the container as another reservoir layer 17' below the first liquid reservoir 4'. Dual submersible electric fluid pumps 18, 18', (manufactured by Beckett of Irving, Tex.) are mounted at different levels within the container itself so that their respective inlets (not shown) communicate respectively with reservoirs 4' and 17' of the first and third liquids, respectively, and respective outlets 19, 19' communicate with the second, least dense liquid 5 for injecting the more dense liquids therein in response to changes in audible sounds. A bulb and reflector assembly 21, 22 is also mounted within the base aligned centrally below the container with the reflector 22 arranged to direct the bulb light upwards through the bottom of the container.

In the third embodiment shown in FIG. 2C, a single submersible (Beckett) pump 18 is mounted in the container with an inlet (not shown) and outlet 19 communicating with the first liquid reservoir 4' and less dense liquid 5, respectively. A bulb 23 in a clear liquid-tight housing is submerged within the container 1. Operation is similar to the other embodiments. In the second and third embodiments the pump outlets can be below the levels of the reservoirs of denser liquids, preferably, thereby concealed from a spectators view.

Figure 3:
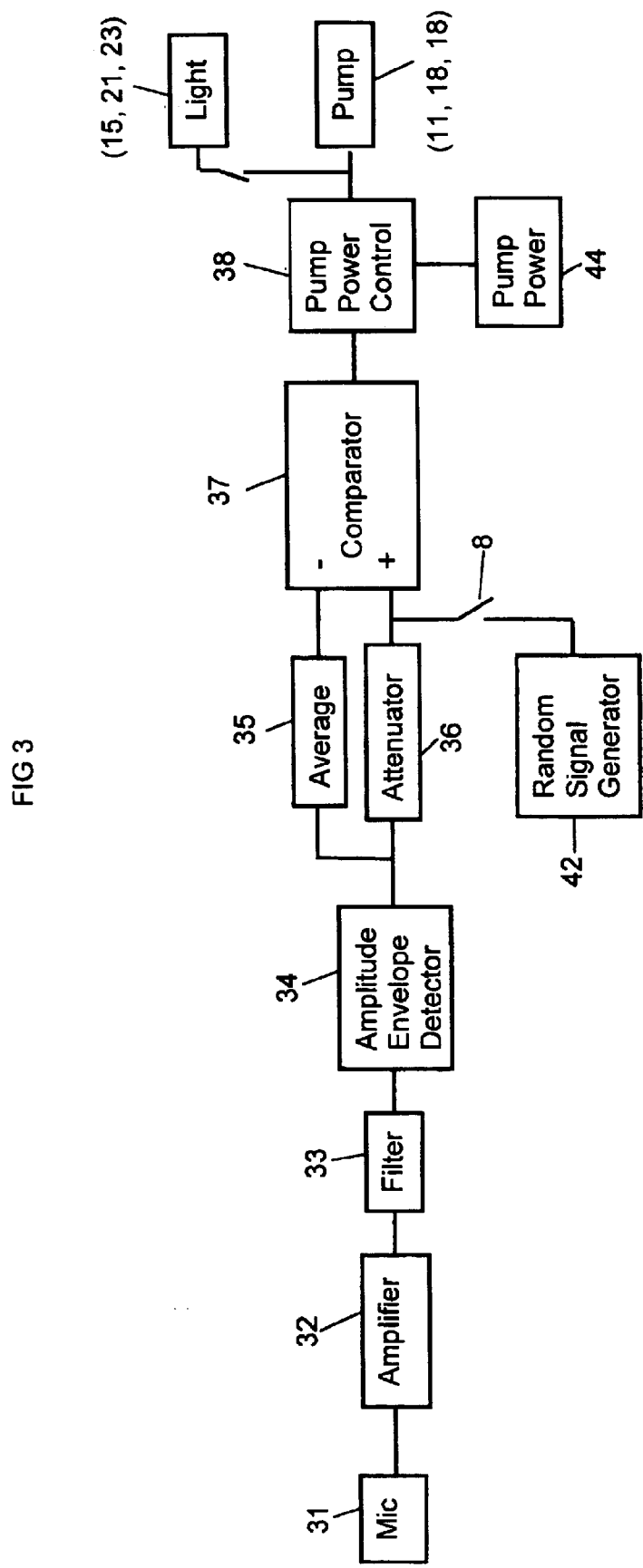
FIG. 3 is a block diagram of control circuitry of the display device.

In all embodiments, a control circuit board 24 carrying circuitry indicated in FIG. 3 is mounted within the base.

As shown in FIG. 3, an output signal from a microphone 31, (located within or remotely from the display device) is connected to amplifier 32 and a desired frequency range is selected by filter 33. The filter 33 can be of low, band, or high-pass type, fixed or variable, depending on the frequency range of interest. For example, a 200 Hz low-pass filter can be used to extract the beat from dance music. A 100–900 Hz bandpass filter can be employed to extract the syllabic content of speech, etc. The short-time amplitude envelope of the filtered signal is detected by detector 34. This envelope is then presented simultaneously to long-time averager 35 and attenuator 36. The long-time averager 35 creates a DC reference signal proportional to the average sound level which reference signal is compared by comparator 37 with an attenuated version of the short-time envelope. When the short-time envelope momentarily rises above the reference average, the comparator changes state, activating pump power control 38 causing electric power 44 to be delivered to a pump 11 or 18,18', and optionally a lamp 15, 21 or 23. As a result of the operation of attenuator 36, the short-time envelope must overcome the level difference created by the attenuator to trigger the comparator 37.

The pump may also be controlled by automatic means. Switch 8 admits the signal from random signal generator 42 which produces pulses at perceptibly random intervals to control the action of the pump/lamp when sound activation is not desired.

Multiple separate chains of components 33–38, 42, 44 may be connected to the output of amplifier 32 to implement a plurality of channels operating separate pumps such as pumps 18 and 18' in the same container of the second embodiment shown in FIG. 2B. The type and/or cut-off frequencies of each filter 33 may be different for each channel resulting in a unique response by each pump 18 or 18' to audio stimuli from the microphone 31.

The pump is run whenever significant sound events occur in the vicinity of the display unit. A significant sound event is defined as any sound within a selected frequency range which rises a fixed threshold value above the ambient sound level. Useful thresholds lie between 2–6 db. The viscosity and time base of the averager largely determine the continuity and length of the geyser, the number and size of the globules.

It is important to chose the relative viscosities of the liquids correctly as the speed of globule descent is controlled primarily by the relative viscosities. In one embodiment, the liquid 5 of less density can be petrolatum and the more dense liquid 4 can be propylene glycol.

In an alternative, (not described) louder music within a selected frequency range could cause the control circuitry to supply more power to the pump, resulting in a taller liquid spout being injected than softer music, the amplitude of the spout being modulated by the sound pressure level (SPL).

Figure 4:
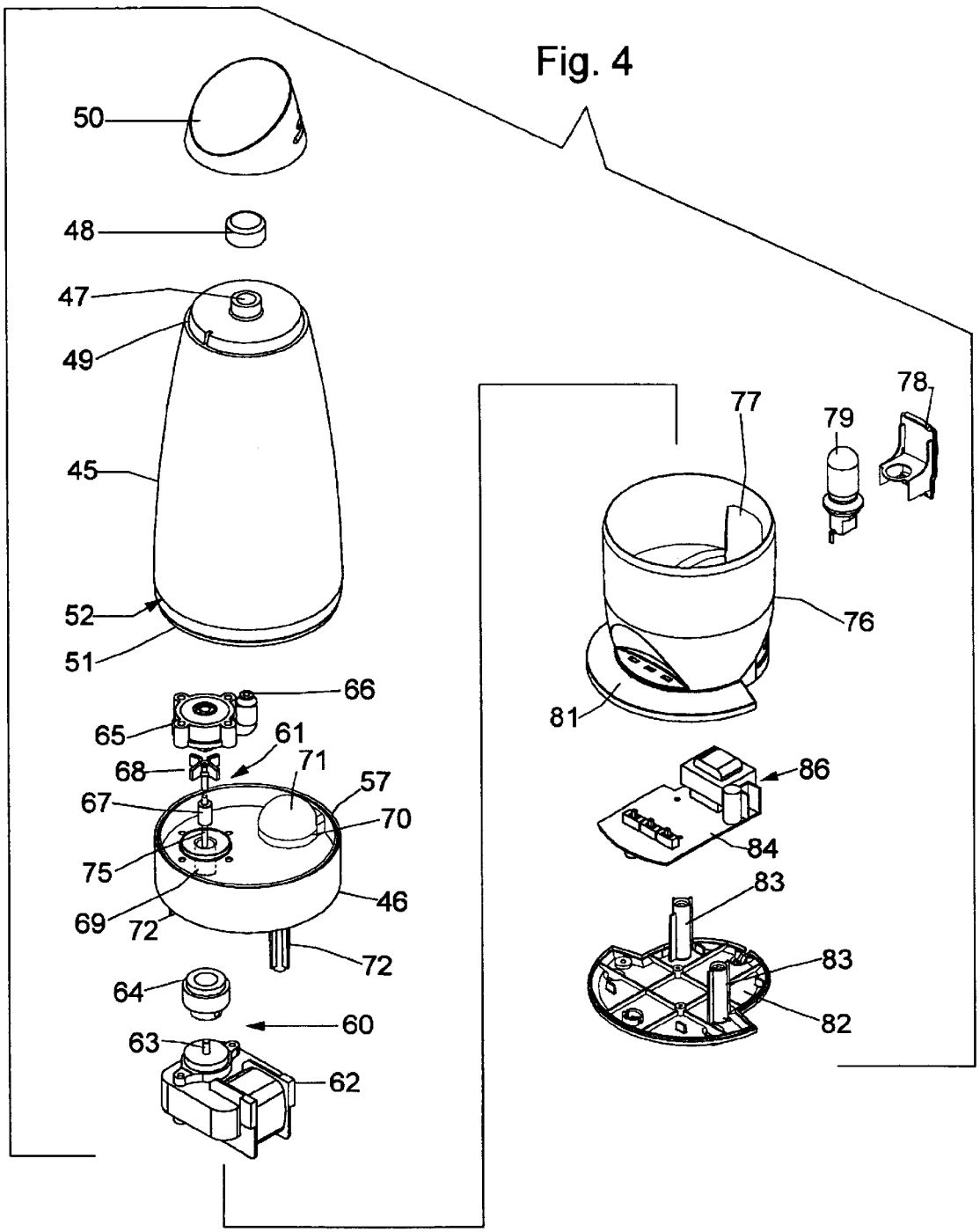
FIG. 4 is a schematic exploded perspective view of another embodiment.

In a fourth embodiment, shown in FIG. 4, a magnetic drive pump is employed as the provision of a magnetic coupling eliminates the conventional shaft seal and the risk of leakage associated therewith. The polycarbonate container has an upper, clear-walled viewing portion 45 and an opaque pump and lamp mounting base portion 46. The upper portion 45 is molded with a top filler opening 47 with a threaded neck closed by a threaded cap 48 and a rebate 49 providing a seat for a decorative cover 50. The bottom has a knife edge rim 51 below a peripheral mounting shoulder 52. When assembled, the knife edge rim 51 of the container is ultrasonically welded (alternatively, cemented) inside a grooved upper lip 57 of a peripheral wall of the cylindrical motor and lamp mounting base portion 46

The magnetic drive pump comprises a first sub-assembly 60 and a second sub-assembly 61, mounted outside and inside the container, respectively. The first sub-assembly 60 comprising an electric motor 62 with a drive shaft 63 and a cylindrical drive magnet 64 with one axial end mounted thereon. The second sub-assembly 61 comprises an impeller housing 65 with a liquid inlet and a liquid outlet 66, a cylindrical driven magnet 67, and an impeller 68 with one axial end fixed to the driven magnet 67. The base portion 46 is integrally molded with a holder 70 for lens 71, depending mounting legs 72 a seat for the impeller housing 65 and an outwardly protruding, cylindrical magnet housing portion 69 with a blind, outer end. In the assembly, the drive magnet 64 and the driven magnet 67 are mounted for rotation in coaxial, substantially concentric relation surrounding and within the cylindrical housing portion 69, respectively, so that the drive magnet and driven magnet are magnetically coupled together, whereby the impeller is rotated by the electric motor.

The impeller is mounted for rotation on a stationary spindle 75 mounted coaxially in the cylindrical housing portion housing 69 with upper and lower axial ends of the spindle captivated by the impeller housing and the blind end, respectively.

A substantially cylindrical base member 76 is formed with a side window 77 on an upper wall part for receiving a mounting bracket 78 for a lamp 79 and, an arcuate mounting flange 81 for assembly with a base plate 82 of complementary shape and molded with upstanding mounting posts 83 of complementary shape to the mounting legs 72.

A circuit board 84 carrying the operating circuitry and a step down DC power supply (transformed/rectifier) 86 is mounted on the base plate 82.

To assemble the container with the base member 76, the mounting base portion 46 carrying the electric motor is seated on the upper rim of the base member 76 with the legs 72 inserted therethrough, mated with the posts 83 on the base plate, so that the base member conceals the electric motor and circuit board from view within the base member.

The device uses two or more insoluble liquids to achieve the effect of the lower heavier fluid being injected into the upper lighter liquid. This liquid injection provides the appearance of a geyser, and under electronic control this injection creates a very entertaining visual display.

In a first example, the liquid of greater specific gravity is a combination of Propylene Glycol, Glycerin and Water mixed in any combination of quantities to achieve the desired viscosity. The addition of more water provides a more foamy opaque, mixture which may be desirable because it reflects light better than a mixture that is clearer.

The liquid of less specific gravity or density is a paraffinic oil such as Lamplight Farms, Ultra-Pure Lamp Oil, a petroleum hydrocarbon consisting of 98% normal paraffin (liquid wax). It consists of high-purity, linear saturated paraffin blends of various molecular weights in the carbon range of C10–C16 and of low viscosity.

Either solution may be colored with an appropriate dye. The more dense, lower phase solution with a water-soluble food coloring agent and the upper phase with an oil based dye such as Abbey Products, of Philadelphia, Pa., Acol Red.

In a second preferred example, the more dense liquid is chlorinated paraffin, such as Ferro Corporation of Hammond, Ind., CW 45–50 and the less dense liquid is distilled water.

Anti-growth additives such as alcohol or chlorine may be added to the water to prevent bacterial, mold or algae growth. Either solution may be colored with an appropriate dye. The more solution with an oil based dye such as Abbey Products, Acol Red and the less dense liquid with a water soluble food coloring agent.

Figure 5:
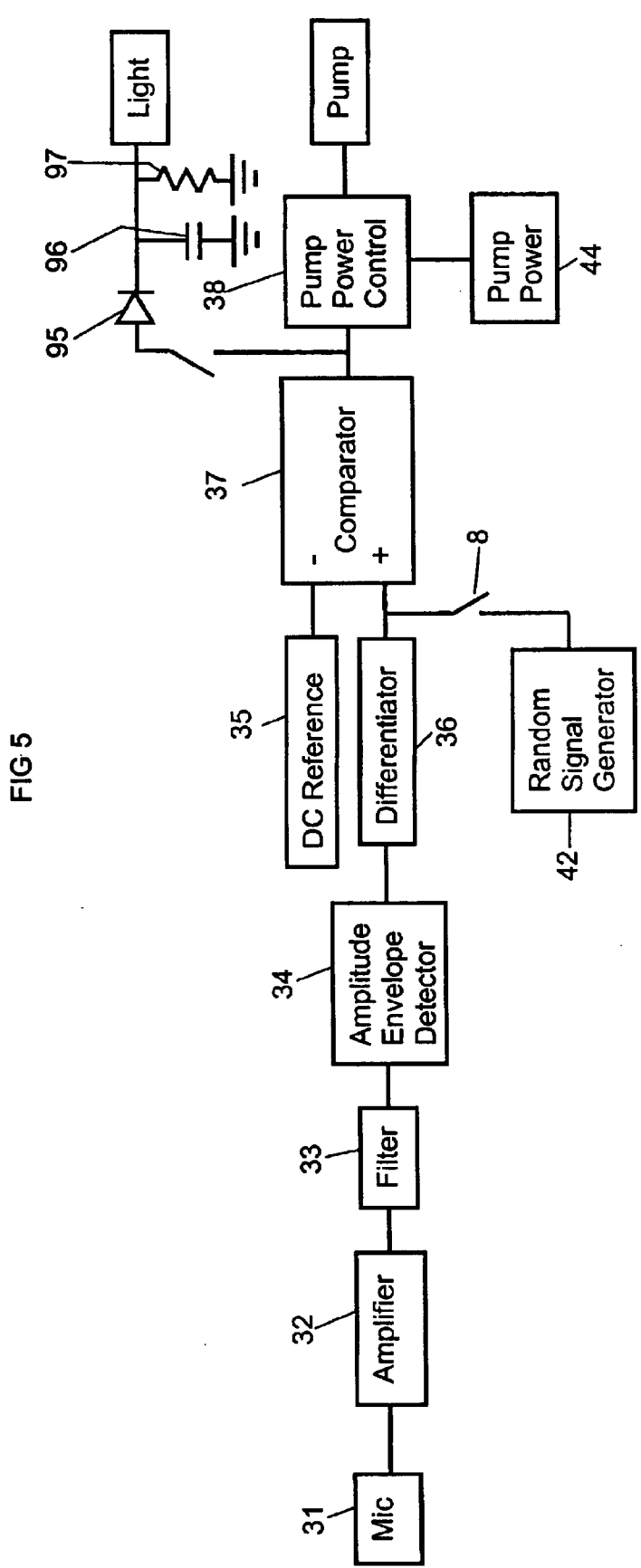
FIG. 5 is a block diagram of alternative control circuitry

In an alternative control circuit shown in FIG. 5, the averager and attenuator are replaced by a DC reference voltage source derived from the DC voltage supply and, a differentiating circuit.

Following amplitude detector 34, is a differentiator circuit which has a time constant arranged such that rapidly changing signals are passed with little attenuation and slowly rising and falling signals are suppressed resulting in the differentiator's output remaining at or about zero. This signal is applied to the non-inverting input of comparator 37. The inverting input of comparator 37 is held at a fixed DC reference voltage. Because the DC reference voltage 35 is greater than the quiescent output of differentiator 36, comparator 37 usually remains off (logic low). If a significant (above the ambient) audio signal which is detected by 34 and passed by differentiator 36 exceeds the fixed DC threshold level, comparator 37 will change stat (to logic high) resulting in the activation of the pump power control 38, the pump and the light In alternative lamp/light control, a transient decay circuit is employed to provide gradual lamp fade in synchronism with the rate at which the globules of more dense liquid fall back through the less dense liquid after spouting up therein in geyser-like manner. The (incandescent) lamp 79 is driven by a conventional voltage controlled AC dimmer circuit. When comparator 37 goes to logic high, a capacitor 96 is charged through diode 95 and held charged for the duration the comparator remains in that state. When comparator 37 returns to logic low, capacitor 16 discharges through resistor 97 with a time constant arranged to be similar to the time taken for the liquid in the vessel to return to its quiescent state. The voltage on capacitor 96 controls the voltage-controlled AC dimmer circuit (not shown) so that in response to a significant audio signal, the denser liquid 4 is pumped up through the less dense liquid 5 simultaneously with the full illumination of lamp 79. When the audio signal ceases, comparator 37 returns to its logic low state resulting in the de-activation of the pump. The denser liquid is then falling back to the bottom of the container, taking a few moments as determined by the the viscosity of the liquids. During this brief period, capacitor 96 controlling the dimmer is discharging through resistor 97 causing light 79 to slowly dim back to darkness.

The disclosure of provisional application No. 60/267910 filed Feb. 9, 2001, from which priority is claimed, is incorporated herein by reference.

What is claimed is:

1. A display device comprising a liquid container having a transparent wall portion and containing two immiscible liquids having different visual characteristics and at least one of different specific gravities and different viscosities and, a means responsive to significant changes in at least one sound parameter in the vicinity of the display device for injecting one liquid into the other liquid at rates related to said significant changes to provide a visual display for viewing through the wall portion, the visual display reacting to at least one of music and voices.

2. A display device according to claim 1 wherein said significant changes are in at least one of volume and frequency.

3. A display device according to claim 1 wherein said means injects one liquid into the other for dispersion and suspension therein as one or more distinct globules at sizes determined by deviations from ambient sound levels.

4. A display device according to claim 1 wherein said means comprises a pump for injecting one of the liquids upwards as a spout from a bottom of the container into the other of the liquids, said one liquid being of greater specific gravity than said other liquid, so that said one liquid disperses from the spout falls through said other liquid after injection therein.

5. A display device according to claim 1 wherein the one liquid has greater opacity than the other liquid into which it is injected.

6. A display device according to claim 4 further comprising a lamp arranged to shine upwards into the container to illuminate the visual display and a means for changing a level of illumination provided by the lamp in response to said significant changes in said at least one sound parameter in the vicinity of the device.

7. A display device according to claim 4 further comprising a lamp arranged to illuminate the visual display and a means for changing a level of illumination provided by the lamp in response to said significant changes in said at least one sound parameter.

8. A display device according to claim 7 wherein the means for changing the level of illumination provided by the lamp comprises a means to increase power supplied to the lamp to increase illumination in response to a significant change in said at least one sound parameter and to progressively reduce power supplied to the lamp to dim the lamp at a rate related to a time taken for the one liquid to fall back through the other, less dense liquid to a bottom of the container.

9. A display device according to claim 8 wherein the power increasing and reducing means comprises a voltage controlled dimmer circuit connected to supply power to the lamp and a capacitor providing control voltage for the dimmer circuit and arranged to discharge through a resistor with a time constant similar to a time taken for the denser liquid to fall back through the less dense liquid to a bottom of the container.

10. A display device according to claim 1 wherein said means comprises:
   a microphone;
   an amplifier connected to the microphone to amplify a signal received therefrom;
   a filter connected to the amplifier for extracting from the amplified signal, a signal component representing one of a beat from dance music and syllabic content of speech;
   an amplitude envelope detector connected to the filter for detecting a short-time amplitude envelope of the signal component from the filter;
   a long time averager and an attenuator both connected to the amplitude detector envelope for simultaneously receiving the envelope, the long-time averager creating a DC reference signal proportional to an average sound level;
   a comparator connected to both the long time averager and to the attenuator for comparing the DC reference signal with an attenuated version of the short-time amplitude envelope from the attenuator;
   an electric pump power controller for connection between the comparator and a power source; and,
   an electric pump for connection to the power source by the electric pump power controller,
   the comparator changing state when the attenuated version of the short time amplitude envelope momentarily rises above the DC reference signal proportional to the average sound level, to provide an activating signal to the pump power controller causing electric power to be delivered to the pump.

11. A display device according to claim 1 wherein said means comprises:
   a microphone;
   an amplifier connected to the microphone to amplify a signal received therefrom;
   a filter connected to the amplifier for extracting from an amplified signal, a signal component representing one of a beat from dance music and syllabic content of speech;
   an amplitude envelope detector connected to the filter for detecting a short-time amplitude envelope of the signal component from the filter;
   a differentiator circuit connected to an output of the amplitude envelope detector to output rapidly changing signals detected by the amplitude envelope detector;
   means providing a constant reference DC voltage;
   a comparator connected to both the differentiator output and the DC reference voltage;
   an electric pump power controller for connection between the comparator and a power source; and,
   an electric pump for connection to the power source by the electric pump power controller,
   the comparator changing state when the value of the differentiator output rises above the DC reference voltage, to provide an activating signal to the pump power controller causing electric power to be delivered to the pump.

12. A display device according to claim 11 wherein the filter is one of a 200 Hz low-pass filter to extract the signal component representing beat from dance music and a 100–900 Hz bandpass filter to extract the signal component representing the syllabic content of speech.

13. A display device according to claim 11 further comprising a lamp arranged to illuminate the display and connected to the power source via the power controller so that the change in state of the comparator causes power to be delivered to the lamp to increase the illumination thereof.

14. A display device according to claim 1 wherein said means responsive to significant changes in at least one sound parameter in the vicinity of the display device for injecting one liquid into the other liquid comprises an electric pump comprising a first sub-assembly and a second sub-assembly, mounted outside and inside the container, respectively, the first sub assembly comprising an electric motor with a drive shaft and a cylindrical drive magnet with one axial end mounted thereon and the second sub-assembly comprising an impeller housing with a liquid inlet and a liquid outlet, a cylindrical driven magnet, and an impeller with one axial end mounted on the driven magnet, the container being integrally molded with an outwardly protruding, cylindrical magnet housing portion with a blind, outer end; the drive magnet and the driven magnet being mounted for rotation in coaxial relation surrounding and within the cylindrical housing portion, respectively, so that the drive magnet and driven magnet are magnetically coupled together, whereby the impeller is rotated by the electric motor.

15. A display device according to claim 14 wherein a spindle is mounted coaxially in the cylindrical housing portion housing with upper and lower axial ends of the spindle supported by the impeller housing and the blind end, respectively, and the impeller is mounted for rotation on the spindle.

16. A display device according to claim 4 wherein said one liquid is a mixture comprising propylene glycol, glycerin and water and said another liquid consists essentially of a paraffin oil.

17. A display device according to claim 16 wherein said paraffin oil is 98% paraffin.

18. A display device according to claim 4 wherein said one liquid consists essentially of chlorinated paraffin and said another liquid consists essentially of distilled water.

19. A method of providing a liquid display comprising a step of co-mingling immiscible liquids of different appearances at rates determined by changes in ambient sound parameters in an audio range to provide a display which reacts to at least one of music and voices.

20. A method according to claim 19 wherein one of the liquids is of greater specific gravity than another of the liquids and the liquids are co-mingled by injecting said one liquid from below upwardly into said another liquid so that said one liquid falls through said another liquid subsequent to injection so that the display is a geyser.

* * * * *